(12) United States Patent
Zhang et al.

(10) Patent No.: US 11,593,594 B2
(45) Date of Patent: Feb. 28, 2023

(54) DATA PROCESSING METHOD AND APPARATUS FOR CONVOLUTIONAL NEURAL NETWORK

(71) Applicant: TENCENT TECHNOLOGY (SHENZHEN) COMPANY LIMITED, Shenzhen (CN)

(72) Inventors: Yangming Zhang, Shenzhen (CN); Jianlin Gao, Shenzhen (CN); Heng Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/522,891

(22) Filed: Nov. 9, 2021

(65) Prior Publication Data
US 2022/0067447 A1    Mar. 3, 2022

Related U.S. Application Data

(63) Continuation of application No. 16/250,204, filed on Jan. 17, 2019, now Pat. No. 11,222,240, which is a
(Continued)

(30) Foreign Application Priority Data

Oct. 31, 2016    (CN) .......................... 201610933471.7

(51) Int. Cl.
*G06K 9/62* (2022.01)
*G06F 17/16* (2006.01)
(Continued)

(52) U.S. Cl.
CPC ........... *G06K 9/6262* (2013.01); *G06F 17/16* (2013.01); *G06K 9/6274* (2013.01); *G06N 3/02* (2013.01);
(Continued)

(58) Field of Classification Search
CPC combination set(s) only.
See application file for complete search history.

(56) References Cited

U.S. PATENT DOCUMENTS

| | | |
|---|---|---|
| 2016/0179434 A1 | 6/2016 | Herrero et al. |
| 2017/0017793 A1 | 1/2017 | Davis et al. |
| 2017/0132496 A1 | 5/2017 | Shoaib et al. |

FOREIGN PATENT DOCUMENTS

| | | |
|---|---|---|
| CN | 1560727 A | 1/2005 |
| CN | 104077233 A | 10/2014 |

(Continued)

OTHER PUBLICATIONS

The World Intellectual Property Organization (WIPO) International Search Report for PCT/CN2017/108468 dated Jan. 31, 2018 6 Pages (including translation).
Lu,Zhijian, "The Research on Parallel Architecture for FPGA based Convolutional Neural Networks", Chinese Doctoral Dissertations Full-text Database (Information Technology), Apr. 15, 2014 (Apr. 15, 2014), No. 04, ISSN: 1674-022X. text, sections 4.2.1 and 4.3.1 123 Pages.

(Continued)

*Primary Examiner* — Zhiyu Lu
(74) *Attorney, Agent, or Firm* — AnovaLaw Group PLLC

(57) ABSTRACT

A data processing method for a convolutional neural network includes: (a) obtaining a matrix parameter of an eigenmatrix; (b) reading corresponding data in an image data matrix from a first buffer space based on the matrix parameter through a first bus, to obtain a next to-be-expanded data matrix, and sending and storing the to-be-expanded data matrix to a second preset buffer space through a second bus; (c) reading the to-be-expanded data matrix, and performing data expansion on the to-be-expanded data matrix to obtain expanded data; (d) reading a preset number of pieces of unexpanded data in the image data matrix,
(Continued)

sending and storing the unexpanded data to the second preset buffer space, and updating, based on the unexpanded data, the to-be-expanded data matrix; and (e). repeating (c) and (d) until all data in the image data matrix is completely read out on the to-be-expanded data matrix.

20 Claims, 13 Drawing Sheets

Related U.S. Application Data continuation of application No. PCT/CN2017/108468, filed on Oct. 31, 2017.

(51) Int. Cl.
*G06N 3/08* (2023.01)
*G06N 3/04* (2023.01)
*G06N 3/02* (2006.01)
*G06V 10/94* (2022.01)
*G06V 10/44* (2022.01)

(52) U.S. Cl.
CPC .............. *G06N 3/04* (2013.01); *G06N 3/08* (2013.01); *G06V 10/454* (2022.01); *G06V 10/94* (2022.01)

(56) References Cited

FOREIGN PATENT DOCUMENTS

| CN | 104899182 A | 9/2015 |
| CN | 104915322 A | 9/2015 |
| CN | 105260773 A | 1/2016 |
| CN | 105447566 A | 3/2016 |
| CN | 105678378 A | 6/2016 |
| CN | 105844653 A | 8/2016 |

OTHER PUBLICATIONS

The State Intellectual Property Office of the People's Republic of China (SIPO) Office Actions 1 for 201610933471.7 dated Aug. 19, 2019 10 Pages (including translation).

Deep_learninger, "Caffe convolution calculation method", Aug. 18, 2015, Retrieved from the Internet URL: https//blog.csdn.net/u014114990/article/delails/47754965, [retrieved on Aug. 20, 2019], p. 2 4 Pages total.

Jin-Feng Liu, "A Concise and Efficient Method for Accelerating Convolution Neural Networks", Science Technology and Engineering, vol. 14 No. 33, Nov. 28, 2014 (Nov. 28, 2014), p. 240-244 8 Pages total.

Andrew Lavin et al., "Fast Algorithms for Convolutional Neural Networks", CVPR2016, Jun. 30, 2016 (Jun. 30, 2016), p. 4013-4021 9 Pages total.

FIG. 3G
FIG. 3H
FIG. 3I
| 11 | 12 | 13 | 21 | 22 | 23 | 31 | 32 | 33 |
|----|----|----|----|----|----|----|----|----|
| 12 | 13 | 14 | 22 | 23 | 24 | 32 | 33 | 34 |
| 13 | 14 | 15 | 23 | 24 | 25 | 33 | 34 | 35 |
| 21 | 22 | 23 | 31 | 32 | 33 | 41 | 42 | 43 |
| 22 | 23 | 24 | 32 | 33 | 34 | 42 | 43 | 44 |
| 23 | 24 | 25 | 33 | 34 | 35 | 43 | 44 | 45 |
| 31 | 32 | 33 | 41 | 42 | 43 | 51 | 52 | 53 |
| 32 | 33 | 34 | 42 | 43 | 44 | 52 | 53 | 54 |
| 33 | 34 | 35 | 43 | 44 | 45 | 53 | 54 | 55 |
X
| 1 |
|---|
| 2 |
| 3 |
| 4 |
| 5 |
| 6 |
| 7 |
| 8 |
| 9 |
FIG. 4

DATA PROCESSING METHOD AND APPARATUS FOR CONVOLUTIONAL NEURAL NETWORK

RELATED APPLICATIONS

This application is a continuation application of U.S. patent application Ser. No. 16/250,204, filed on Jan. 17, 2019. U.S. patent application Ser. No. 16/250,204 is a continuation application of PCT Patent Application No. PCT/CN2017/108468, filed on Oct. 31, 2017, which claims priority to Chinese Patent Application No. 201610933471.7, entitled "DATA PROCESSING METHOD AND APPARATUS FOR CONVOLUTIONAL NEURAL NETWORK" filed with the Patent Office of China on Oct. 31, 2016, which is incorporated by reference in its entirety.

FIELD OF TECHNOLOGY

The present disclosure relates to the field of neural network technologies and, specifically, to a data processing method and apparatus for a convolutional neural network (CNN).

BACKGROUND

Neural networks and deep learning algorithms have been successfully applied and are rapidly developing. It is commonly expected in the industry that such novel calculation approaches can help implement more common and more complex intelligent applications. A convolutional neural network (CNN) plays an important role in deep learning because of its effect in the field of images, and is one of the most widely applied neural networks.

A convolution operation of the CNN is mainly focused on the convolutional layer, and the convolution operation of the CNN may be divided into two processes, namely, data expansion and matrix multiplication. However, during a data expansion process of the CNN, some pieces of data are repeatedly read many times, easily resulting in increment of data bandwidth or enlargement of storage space required for the convolution operation, and degradation of the data processing capability of the processing system for the CNN.

The disclosed methods and systems are directed to solve one or more problems set forth above and other problems.

SUMMARY

Embodiments of the present disclosure provide a data processing method and apparatus for a CNN and a non-volatile computer-readable storage medium, so as to improve a data processing capability of the processing system for the CNN.

One aspect of the present disclosure includes a data processing method for a convolutional neural network (CNN). The method includes: (a). obtaining, by a computing device, a matrix parameter of an eigenmatrix; (b). reading, by the computing device, corresponding data in an image data matrix from a first buffer space based on the matrix parameter through a first bus, to obtain a next to-be-expanded data matrix, and sending and storing the to-be-expanded data matrix to a second preset buffer space through a second bus; (c). reading, by the computing device, the to-be-expanded data matrix from the second preset buffer space through the second bus, and performing data expansion on the to-be-expanded data matrix based on the matrix parameter, to obtain expanded data; (d). reading, by the computing device, a preset number of pieces of unexpanded data in the image data matrix from the first buffer space through the first bus, sending and storing the unexpanded data to the second preset buffer space through the second bus, and updating, based on the unexpanded data, the to-be-expanded data matrix stored in the second preset buffer space; and (e). repeating, by the computing device, (c) and (d) until all data in the image data matrix is completely read out on the to-be-expanded data matrix based on the matrix parameter.

Another aspect of the present disclosure includes a data processing system. The data processing system includes a central processing unit (CPU) configured to process data associated with a convolutional neural network (CNN); and a co-processor configured to performing operations of the CNN, including: (a). obtaining a matrix parameter of an eigenmatrix; (b). reading corresponding data in an image data matrix from a first buffer space based on the matrix parameter through a first bus, to obtain a next to-be-expanded data matrix, and sending and storing the to-be-expanded data matrix to a second preset buffer space through a second bus; (c). reading the to-be-expanded data matrix from the second preset buffer space through the second bus, and performing data expansion on the to-be-expanded data matrix based on the matrix parameter, to obtain expanded data; (d). reading a preset number of pieces of unexpanded data in the image data matrix from the first buffer space through the first bus, sending and storing the unexpanded data to the second preset buffer space through the second bus, and updating, based on the unexpanded data, the to-be-expanded data matrix stored in the second preset buffer space; and (e). repeating (c) and (d) until all data in the image data matrix is completely read out on the to-be-expanded data matrix based on the matrix parameter.

Another aspect of the present disclosure includes a non-transitory computer-readable storage medium. The non-transitory computer-readable storage medium stores computer program instructions executable by at least one processor to perform: (a). obtaining a matrix parameter of an eigenmatrix; (b). reading corresponding data in an image data matrix from a first buffer space based on the matrix parameter through a first bus, to obtain a next to-be-expanded data matrix, and sending and storing the to-be-expanded data matrix to a second preset buffer space through a second bus; (c). reading the to-be-expanded data matrix from the second preset buffer space through the second bus, and performing data expansion on the to-be-expanded data matrix based on the matrix parameter, to obtain expanded data; (d). reading a preset number of pieces of unexpanded data in the image data matrix from the first buffer space through the first bus, sending and storing the unexpanded data to the second preset buffer space through the second bus, and updating, based on the unexpanded data, the to-be-expanded data matrix stored in the second preset buffer space; and (e). repeating (c) and (d) until all data in the image data matrix is completely read out on the to-be-expanded data matrix based on the matrix parameter.

Other aspects of the present disclosure can be understood by those skilled in the art in light of the description, the claims, and the drawings of the present disclosure.

BRIEF DESCRIPTION OF THE DRAWINGS

To more explicitly explain technical solutions in embodiments of the present disclosure, accompanying drawings describing the embodiments are briefly introduced in the following. Apparently, the following accompanying drawings are only some embodiments of the present disclosure, and a person skilled in the art can derive other drawings from the accompanying drawings without creative efforts.

FIGS. 3A-3I are schematic diagrams of data expansion for a CNN;

FIG. 4 is a schematic diagram of matrix multiplication for a CNN;

DETAILED DESCRIPTION

The following describes the technical solutions in the embodiments of the present disclosure with reference to the accompanying drawings. Obviously, the described embodiments are only some embodiments instead of all embodiments of the present disclosure. Other embodiments obtained by a person of ordinary skill in the art based on the disclosed embodiments without any creative effort fall within the protection scope of the present disclosure.

The embodiments of the present disclosure provide a data processing method and apparatus for a CNN. Detailed descriptions are separately provided below.

This embodiment is described from the perspective of a data processing apparatus for a CNN. The data processing apparatus may be specifically integrated in a processor of a computing device, where the processor may be a CPU, or integrated in a co-processor such as an FPGA, an application-specific integrated circuit (ASIC), a graphics processing unit (GPU).

A data processing method for a CNN includes: obtaining a matrix parameter of an eigenmatrix; reading corresponding data in an image data matrix based on the matrix parameter, to obtain a to-be-expanded data matrix; performing data expansion on the to-be-expanded data matrix based on the matrix parameter, to obtain expanded data; reading a preset number of pieces of unexpanded data in the image data matrix, and updating, based on the unexpanded data, the to-be-expanded data matrix; and returning to performing data expansion on the to-be-expanded data matrix based on the matrix parameter.

Figures 1, 2A:
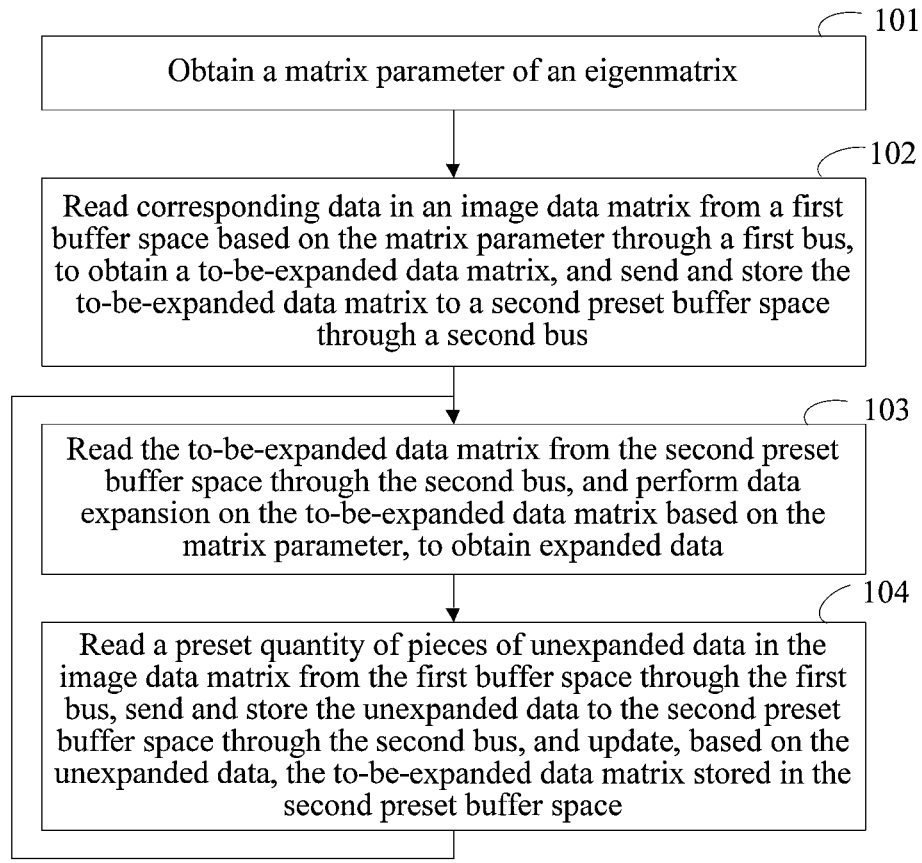
FIG. 1 is a flowchart of a data processing method for a CNN according to an embodiment of the present disclosure.
FIGS. 2A-2D are schematic diagrams of data sliding and expansion according to an embodiment of the present disclosure.

As shown in FIG. 1, a data processing method for a CNN is applied to a computing device, and a specific process performed by a processor or a co-processor of the computing device may include the followings.

Step 101: Obtaining a matrix parameter of an eigenmatrix.

The eigenmatrix is a convolution kernel of a convolution operation, and is also referred to as a weight matrix. The eigenmatrix may be set based on actual requirements. The matrix parameter(s) of the eigenmatrix may include numbers of rows and columns of the matrix and may be referred to as the size of the convolution kernel.

Step 102: Reading corresponding data in an image data matrix from a first buffer space based on the matrix parameter through a first bus, to obtain a to-be-expanded data matrix, and sending and storing the to-be-expanded data matrix to a second preset buffer space through a second bus.

The elements in the image data matrix are pixel data, such as a processed pixel values, corresponding to image pixels. Numbers of rows and columns of the image data matrix represent the size of an image.

The image data matrix may be stored in an accelerator card of a processing system for a CNN. For example, the image data matrix is stored in a DDR memory (double data rate synchronous dynamic random-access memory) of an accelerator card, which is hardware processing circuit board for providing additional processing power for accelerating the data processing. If the image data matrix is stored in a DDR memory, the foregoing first bus is a bus connected between the processor or co-processor and the DDR memory. That is, "read corresponding data in an image data matrix from a first buffer space based on the matrix parameter through a first bus, to obtain a to-be-expanded data matrix" in Step 102 may include: read corresponding data in an image data matrix from a DDR memory based on the matrix parameter through a bus connected between the processor or co-processor and the DDR memory.

In one embodiment, a matrix with a corresponding number of rows or a corresponding number of columns in the image data matrix may be read out based on the matrix parameter(s).

When the matrix parameter includes numbers of rows and columns of the eigenmatrix, a read-out number of rows may correspond to the number of rows of the eigenmatrix, or a read-out number of columns may correspond to the number of columns of the eigenmatrix.

For example, when the image data matrix is an N*N matrix, and the eigenmatrix is a K*K matrix, K rows of data in the N*N image data matrix may be read out, to obtain a K*N to-be-expanded data matrix. K and N are positive integers, and K≤N.

A starting location of the read-out data may be set based on actual requirements. For example, the K rows of data may be read out starting from a first row of the image data matrix, or the K rows of data may be read out starting from a second row.

For another example, when the image data matrix is an N*N matrix, and the eigenmatrix is a K*M matrix, M columns of data in the N*N image data matrix may be read out, to obtain an N*M to-be-expanded data matrix. M is a positive integer, and M≤N.

After the to-be-expanded data matrix is obtained, the to-be-expanded data matrix may be sent and stored to a second preset buffer space through a second bus. The second preset buffer space may be a preset buffer. For example, the preset buffer may be a buffer or a DDR memory in the co-processor, and the second bus is a bus connected between the processor or the co-processor and the preset buffer.

Step 103: Reading the to-be-expanded data matrix from the second preset buffer space through the second bus, and performing data expansion on the to-be-expanded data matrix based on the matrix parameter, to obtain expanded data;

Specifically, data expansion may be performed on the to-be-expanded data matrix based on the numbers of rows and columns of the eigenmatrix. After the expansion, several data sets can be obtained. After the data expansion on the image data matrix is completed, a data matrix, that is, an expanded data matrix, may be formed based on the data sets. Subsequently, matrix multiplication may be performed based on the expanded data matrix and the eigenmatrix, to obtain corresponding data and complete a convolution operation of data.

For example, after the K*N to-be-expanded data matrix is obtained, the K*N to-be-expanded data matrix may be expanded based on the numbers of rows and columns of the eigenmatrix.

In this case, the process of performing data expansion on the to-be-expanded data matrix based on the matrix parameter may include: performing data expansion on the to-be-expanded data matrix based on the matrix parameter and a storage address of data of the to-be-expanded data matrix in the second preset buffer space.

For example, the K*N to-be-expanded data matrix is written to the second preset buffer space, and then data expansion is performed on the K*N to-be-expanded data matrix based on numbers of rows and columns of the K*K eigenmatrix and a storage address of data of the K*N to-be-expanded data matrix in the second preset buffer space.

In one embodiment, sliding and data expansion may be performed on the to-be-expanded data matrix. Specifically, a window is slid on the to-be-expanded data matrix, data expansion is performed on data in the window after each time of sliding, and several data sets may be obtained by the expansion. That is, the process of performing data expansion on the to-be-expanded data matrix based on the matrix parameter and a storage address of data of the to-be-expanded data matrix in the second preset buffer space may include: determining a sliding window based on the matrix parameter; moving the sliding window on the to-be-expanded data matrix based on a preset sliding direction and a preset sliding step length; obtaining a storage address of data in the sliding window in the second preset buffer space after each time of sliding; and reading the corresponding data from the second preset buffer space based on the storage address, to complete the data expansion.

Specifically, a sliding window of a corresponding size can be determined based on row and column data of the eigenmatrix. For example, when the eigenmatrix is a K*K matrix, a K*K sliding window can be determined. The sliding window may be used for selecting corresponding data from the to-be-expanded data matrix for expansion.

The preset sliding direction may include: a row direction, a column direction, and the like, of the image data matrix. In actual applications, the preset sliding direction may correspond to a data reading manner in Step 102. For example, when several rows of data in the image data matrix are read out, the preset sliding direction may be the row direction of the image data matrix. For another example, when several columns of data in the image data matrix are read out, the preset sliding direction may be the column direction of the image data matrix.

The preset sliding step length is the required sliding distance, can be set based on actual requirements for data expansion, and can be represent by the number of pieces of data need to be slid in the data matrix. For example, the preset sliding step length is one piece, two pieces, or three pieces of data, or the like.

After the preset sliding step length, the preset sliding direction, and the sliding window are obtained, the sliding window may be slid or moved on the to-be-expanded data matrix along the preset sliding direction at the preset sliding step length. After each time the window is slid, an address of data in the window in the second preset buffer space can be obtained and, then, corresponding data is read from a preset buffer based on the address and a preset reading sequence, to complete data expansion. That is, data expansion is implemented by reading data in an address hopping manner.

Figure 2B:
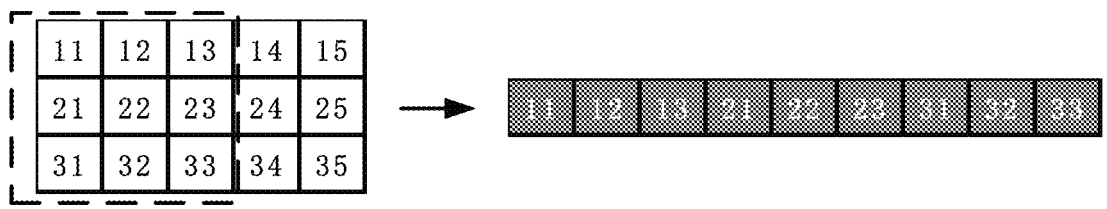
Figure 2C:
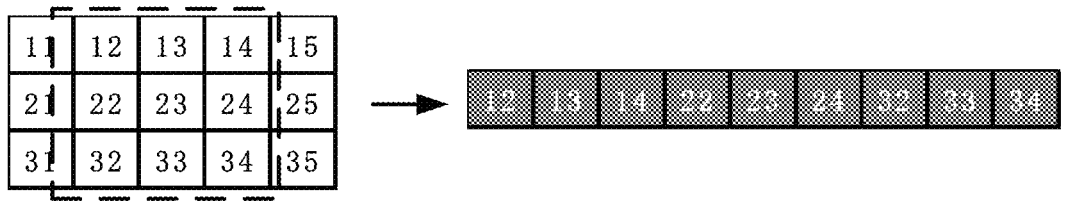
Figure 2D:
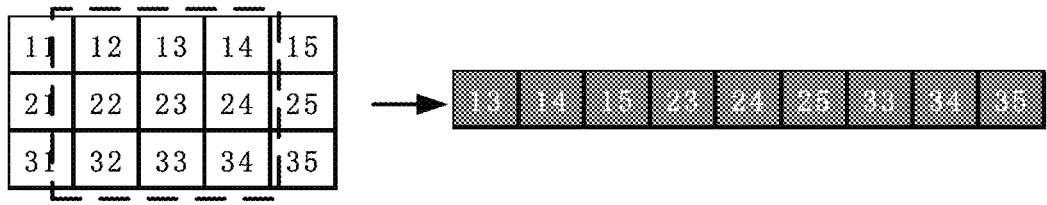

In a schematic diagram of data sliding and expansion as shown in FIG. 2A to FIG. 2D, reading corresponding rows of data from the image data matrix as is used an example, and referring to FIG. 2A, it is assumed that the image data matrix is a 5*5 matrix, and the eigenmatrix is a 3*3 matrix. First, three rows of data are read from the 5*5 image data matrix to obtain a 3*5 to-be-expanded data matrix, that is, the matrix in FIG. 2B to FIG. 2D, and are written into the second preset buffer space, and then, a sliding window, that is, a dashed-line box, is determined based on numbers of rows and columns of the 3*3 eigenmatrix. Referring to FIG. 2B to FIG. 2D, the sliding window may be slid on the 3*5 to-be-expanded data matrix along the row direction at the sliding step length of one piece of data, that is, the sliding window is slid from left to right.

Referring to FIG. 2B, at an initial sliding location, that is, after the $0^{th}$ sliding, a storage address of data in the sliding window in the second preset buffer space can be obtained, and then corresponding data is read from the second preset buffer space in an address hopping manner based on the storage address, to obtain a data set (11, 12, 13, 21, 22, 23, 31, 32, 33), which is referred to as a first data set. Referring to FIG. 2C, after the first data set is obtained, the window is slid in the row direction at the sliding step length of one piece of data. Then, a storage of data in the sliding window in the second preset buffer space is obtained, and corresponding data is read from the second preset buffer space in an address hopping manner based on the storage address, to obtain a data set (12, 13, 14, 22, 23, 24, 32, 33, 34), which is referred to as a second data set.

Referring to FIG. 2D, after the second data set is obtained, the window is continuously slid in the row direction at the sliding step length of one piece of data and, then, a storage of data in the sliding window in the second preset buffer space is obtained. Further, corresponding data is read from the second preset buffer space in an address hopping manner based on the storage address, to obtain a data set (13, 14, 15, 23, 24, 25, 33, 34, 35), which is referred to as a third data set. By then, data expansion on the 3*5 to-be-expanded data matrix is completed.

In one embodiment, the initial location of the sliding window on the to-be-expanded data matrix can be set based on actual requirements, For example, referring to FIG. 2B, sliding may be started from a first column of the to-beexpanded data matrix. In another embodiment, sliding may alternatively be started from a second or third column of the to-be-expanded data matrix.

Similarly, when a corresponding column of data is read from the image data matrix to form a to-be-expanded data matrix, the sliding window may alternatively be determined based on numbers of rows and columns of the eigenmatrix. Then, the window is slid along a column direction of the to-be-expanded data matrix at a preset sliding step length, and after each time the window is slid, a storage address of data in the window in the second preset buffer space is obtained, and corresponding data is read from the second preset buffer space based on the storage address. The data sliding and expansion process thereof is similar to the data sliding and expansion introduced in the foregoing embodiment. Refer to FIG. 2A to 2D. Details are not described herein again.

Step 104: Reading out a preset number of pieces of unexpanded data in the image data matrix from the first buffer space through the first bus, sending and storing the unexpanded data to the second preset buffer space through the second bus, and updating, based on the unexpanded data, the to-be-expanded data matrix stored in the second preset buffer space; and returning to Step 103.

Specifically, a preset number of pieces of unexpanded data in the image data matrix are read out from the first buffer space through the first bus, the read-out unexpanded data is sent and stored to the second preset buffer space through the second bus, and the to-be-expanded data matrix stored in the second preset buffer space is updated based on the unexpanded data.

The number of pieces of the unexpanded data may be set, based on actual requirements, to be, for example, one piece or five pieces, one row or two rows, or one column or two columns.

Specifically, the preset number of pieces of unexpanded data in the image data matrix may be read out from the first buffer space based on a convolution step length through the first bus. The convolution step length represents a number of rows or a number of columns of the unexpanded data that needs to be read from the image data matrix after the to-be-expanded data matrix is expanded.

In an example in which the image data matrix is an N*N matrix, and the eigenmatrix is a K*K matrix, after data expansion is performed on the K*N to-be-expanded data matrix, a specific number of pieces of data, such as a corresponding number of rows or columns of unexpanded data, can be read out from the N*N image data matrix stored in the first buffer space based on the convolution step length. For example, when the convolution step length S=1, a row or a column of unexpanded data can be read from the N*N image data matrix based on the convolution step length and, then, the to-be-expanded data matrix stored in the second preset buffer space is updated based on the read-out unexpanded data.

Specifically, reading row data from the image data matrix to form a to-be-expanded data matrix is used as an example. When the convolution step length S=1, after data expansion is performed on the to-be-expanded data matrix, the $(K+1)^{th}$ row of data can be read from the image data matrix stored in the first buffer space, and the to-be-expanded data matrix stored in the second preset buffer space is updated based on the $(K+1)^{th}$ row of data. After the to-be-expanded data matrix is updated, Step 102 is performed again to read the updated to-be-expanded data matrix from the second preset buffer space through the second bus, and data expansion is performed on the updated to-be-expanded data matrix.

After the expansion is completed, the $(K+2)^{th}$ row of data is further read from the image data matrix stored in the first buffer space, and the current to-be-expanded data matrix is updated based on the $(K+2)^{th}$ row of data. Step 102 is performed again to read the updated to-be-expanded data matrix from the second preset buffer space through the second bus and perform data expansion on the updated to-be-expanded data matrix. After the expansion is completed, the $(K+3)^{th}$ row of data is further read from the image data matrix stored in the first buffer space, and so on until all pieces of data in the image data matrix are completely read out.

The process of updating, based on the unexpanded data, the to-be-expanded data matrix stored in the second preset buffer space may include: reading the unexpanded data from the second preset buffer space through the second bus, and selecting a preset number of pieces of target data from the unexpanded data; and updating, based on the target data, the to-be-expanded data matrix stored in the second preset buffer space. For example, when at least two rows or two columns of unexpanded data in the image data matrix are read, the to-be-expanded data matrix may be updated by selecting one row or column of data from the two rows or two columns of data.

In another embodiment, if the number of pieces of the read-out unexpanded data is equal to the preset number corresponding to the target data, the to-be-expanded data matrix can be updated directly based on the unexpanded data. For example, when the preset number corresponding to the target data is a number of pieces of a row of data, after a row of data in the image data matrix is read, the to-be-expanded data matrix is updated directly based on the row of data. For example, after the $(K+1)^{th}$ row of data is read, the to-be-expanded data matrix is updated directly based on the $(K+1)^{th}$ row of data.

In one embodiment, a manner of updating the to-be-expanded data matrix may include a data-overwriting manner. That is, corresponding data in the to-be-expanded data matrix is overwritten based on the selected target data, to complete the update.

In one embodiment, because some pieces of data in the to-be-expanded data matrix that have been stored into the second preset buffer space can be multiplexed, it is only needed to read a preset number of unexpanded data, that is, data that is not stored to the second preset buffer space, in the image data matrix from the first buffer space, so as to avoid repeatedly reading some pieces of data during data expansion and reduce storage space in a processing system for a CNN. Moreover, because it is only needed to read a preset number of pieces of unexpanded data in the image data matrix through the first bus, and send the unexpanded data to the second preset buffer space through the second bus, the volume of transmitted data is reduced, and transmission bandwidth of the first bus and the second bus is saved, thereby further improving a data processing capability of the system. Specific implementation processes of the data processing method in several types of convolution operations in the embodiments of the present disclosure are introduced below.

Using the image data matrix and eigenmatrix shown in FIG. 2A as an example, FIG. 3A to FIG. 3I show a process of performing data expansion by using a data processing method.

Figure 3A:
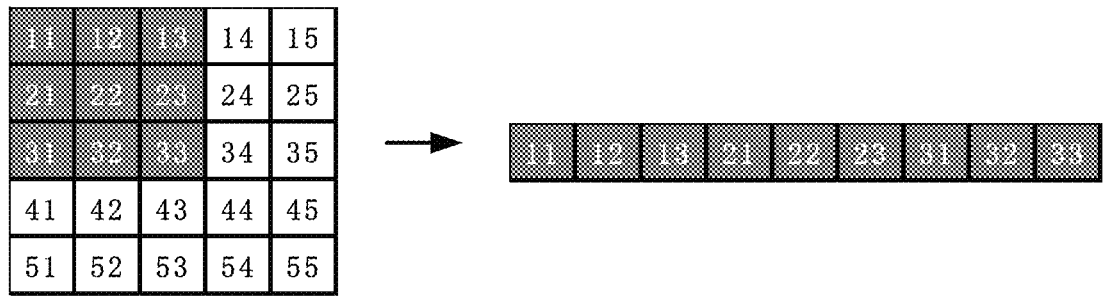
Figure 3B:
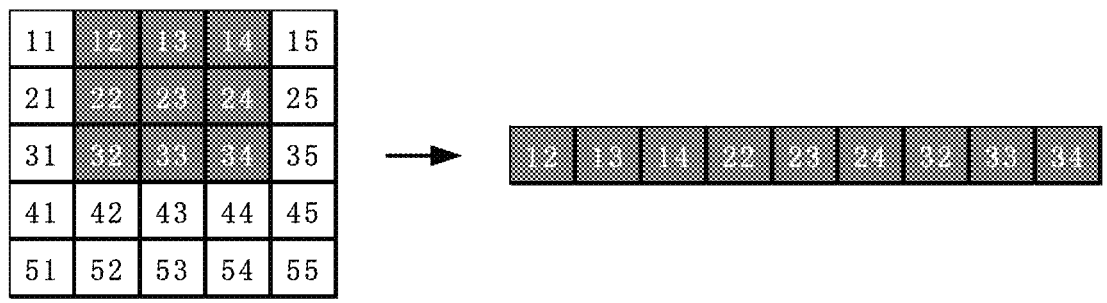
Figure 3C:
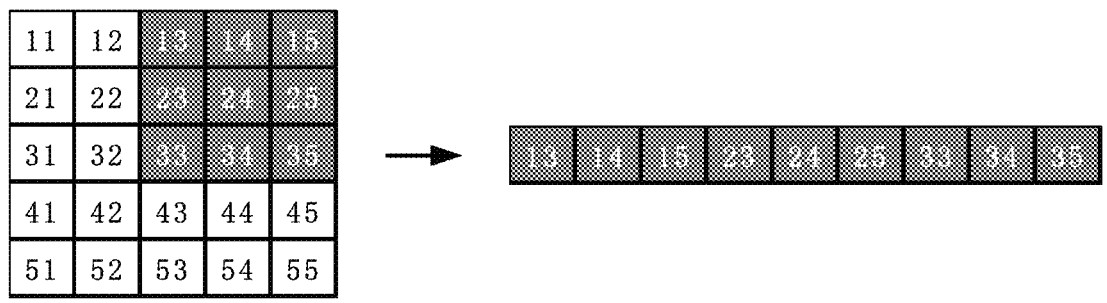
Figure 3D:
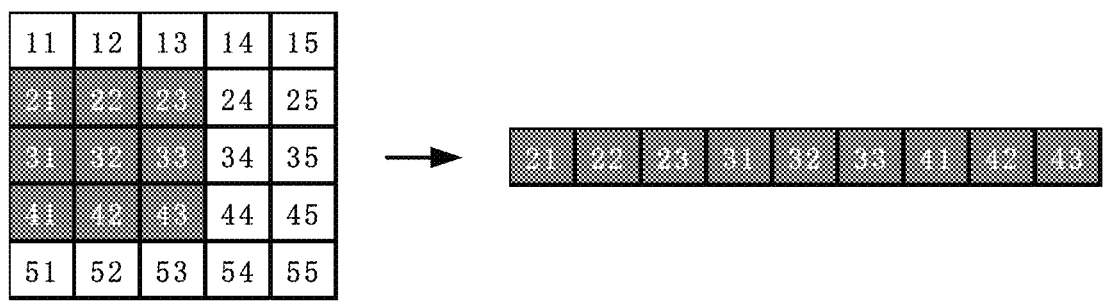
Figure 3E:
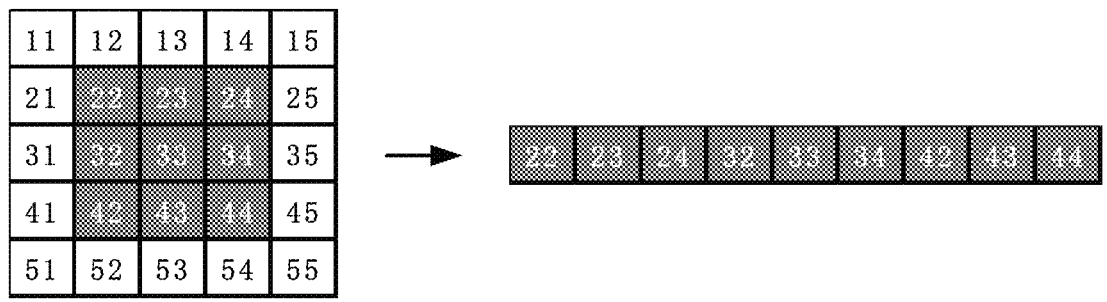
Figure 3F:
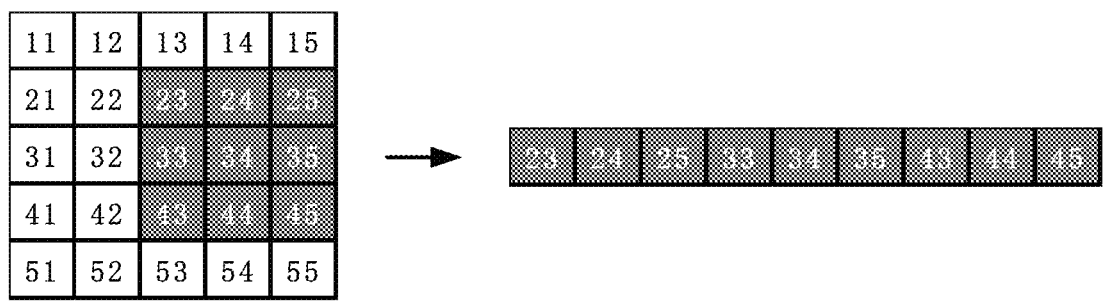

As shown in FIG. 3A, the first group of data is expanded; in FIG. 3B, the second group of data is expanded; in FIG. 3C, the third group of data is expanded; in FIG. 3D, the fourth group of data is expanded; in FIG. 3E, the fifth group of data is expanded; in FIG. 3F, the sixth group of data is expanded; in FIG. 3G, the seventh group of data is expanded; in FIG. 3H, the eighth group of data is expanded; and in FIG. 3I, the ninth group of data is expanded.

After the data expansion, multiplication may be performed on the expanded data matrix and a convolution kernel by referring to FIG. 4, to complex a convolution operation.

It could be learned from FIG. 3A to FIG. 3I that in the data processing method, during data expansion, some pieces of data are repeatedly read many times, easily resulting in increment of data bandwidth or enlargement of storage space, and degradation of a data processing capability of a processing system.

In an actual situation, if the processing system for a CNN uses the data expansion manner shown in FIG. 3A to FIG. 3I, data transmission bandwidth required for data expansion is increased, storage space is enlarged, and a data processing capability of the processing system is degraded.

Figure 5:
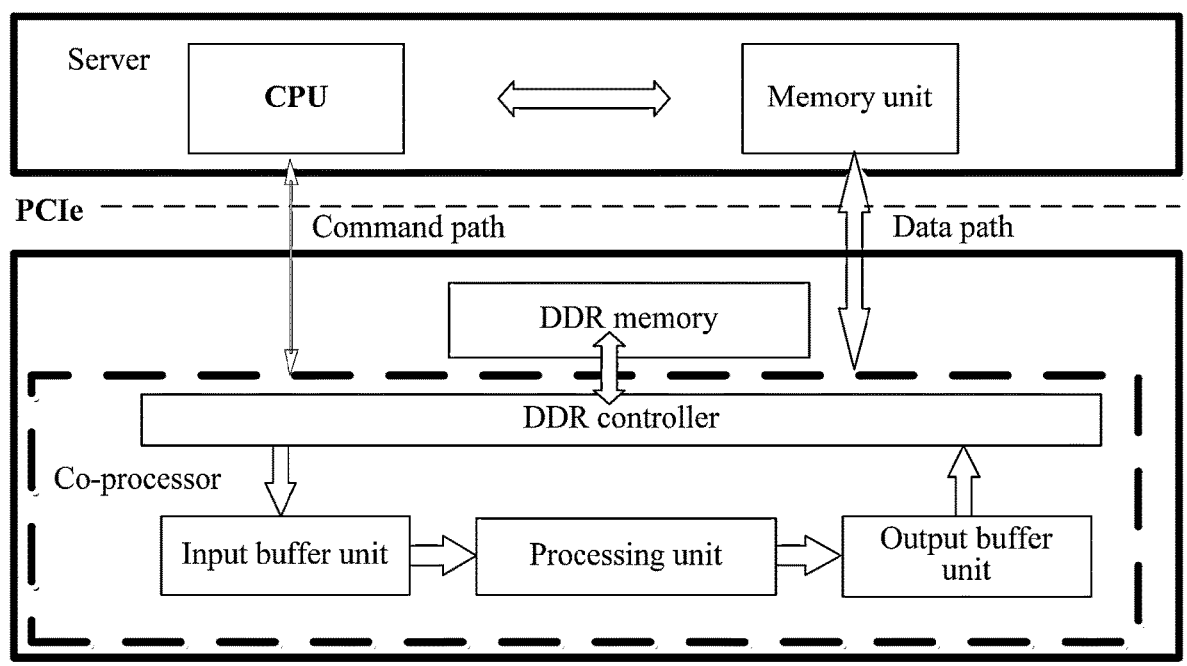
FIG. 5 is a schematic architectural diagram of a processing system for a CNN according to an embodiment of the present disclosure.

The processing system for a CNN shown in FIG. 5 is used as an example to describe a specific implementation process by using a data expansion manner shown in FIG. 3A to FIG. 3I. The processing system includes a co-processor, a CPU of a server and a memory unit (memory), and a DDR memory on an accelerator card. The CPU of the server is connected to the co-processor usually through a peripheral component interconnect express PCI-e (a bus and interface standard) bus, to perform data exchange and command exchange, for example, to perform command exchange by using a command path (CMD path) and to perform data exchange by using a data path.

The co-processor may be an FPGA or another auxiliary processor, and the co-processor may include: a DDR memory controller, an input buffer (InputBuf) (an input data buffer unit), an output buffer (OutputBuf) (an output data buffer unit), and a processing element (PE). The PE is an element configured to complete data convolution in the co-processor.

Data expansion in a current convolution operation may be completed in a CPU of the processing system, or the co-processor as follows.

In an embodiment of the present disclosure, data expansion is completed by using the CPU of the system.

Figure 6A:
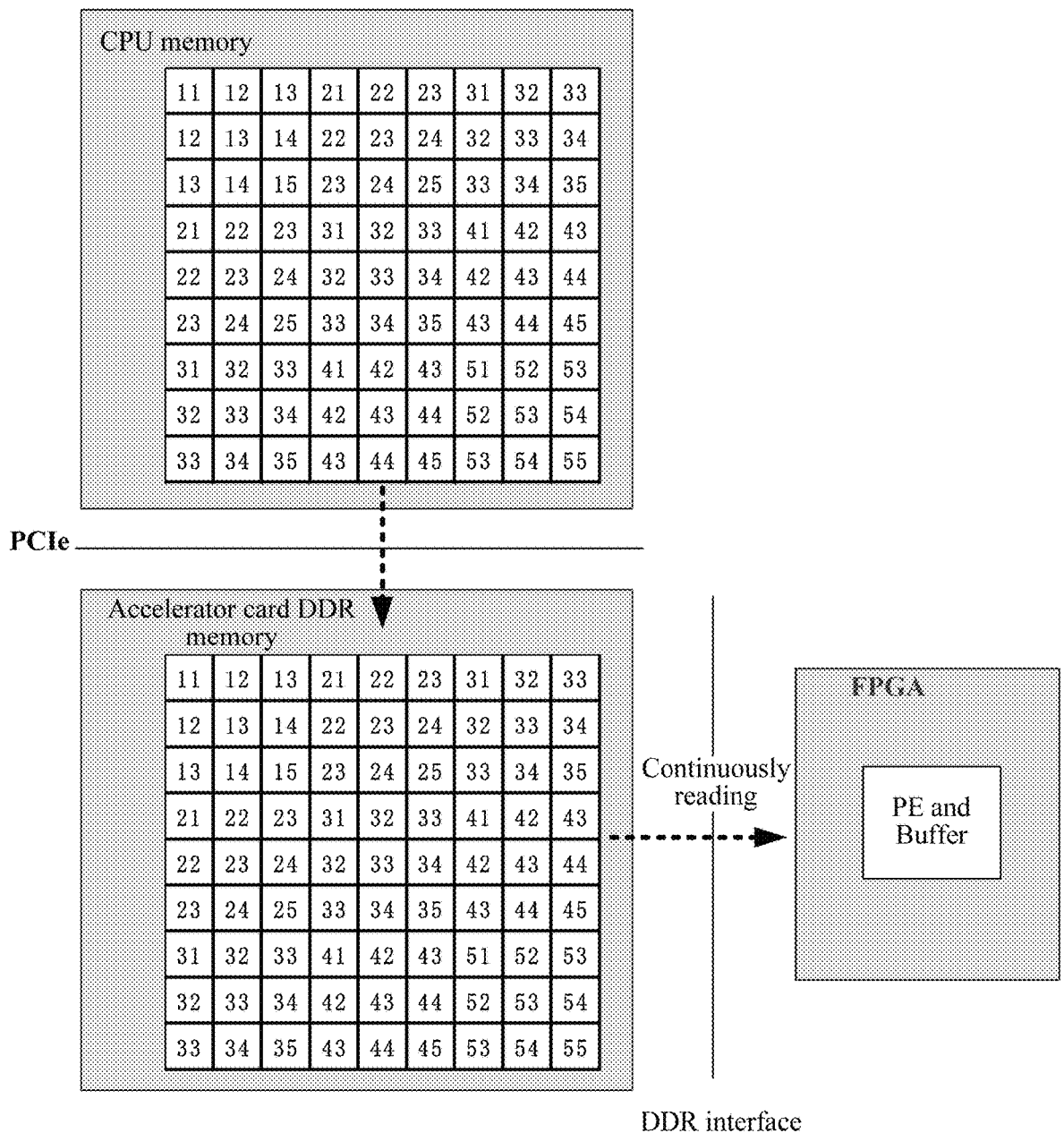
FIG. 6A is a schematic diagram of performing data expansion for a CNN on a CPU.

Referring to FIG. 6A, a solution of data expansion by using a CPU includes: expanding, by a processing system CPU, data in the manner in FIG. 3A to FIG. 3I; after completing expansion, storing the expanded data to a CPU memory, and transmitting the expanded data to a DDR memory on an accelerator card through a PCI-e DMA; and further loading, by the co-processor, the data from the DDR memory on the accelerator card to the PE by using loading logic. It could be learned from FIG. 6A that, if the data processing method shown in FIG. 3A to FIG. 3I is used in the CPU of the system, consequently, data expansion efficiency is relatively low and a volume of transmitted data is increased. Consequently, needed reading bandwidth of the PCI-e and the DDR memory is increased, and a processing capability of the system is degraded.

However, if the data processing method shown in FIG. 2B to FIG. 2D of one embodiment is applied to the CPU of the system, because it is not needed to read-out data repeatedly, data expansion efficiency can be improved. If the data processing method shown in FIG. 2B to FIG. 2D of one embodiment is applied to the co-processor of the system, needed transmission bandwidth of the PCI-e and the DDR memory is reduced.

Thus, in another embodiment of the present disclosure, data expansion is completed by using the co-processor of the system.

Figure 6B:
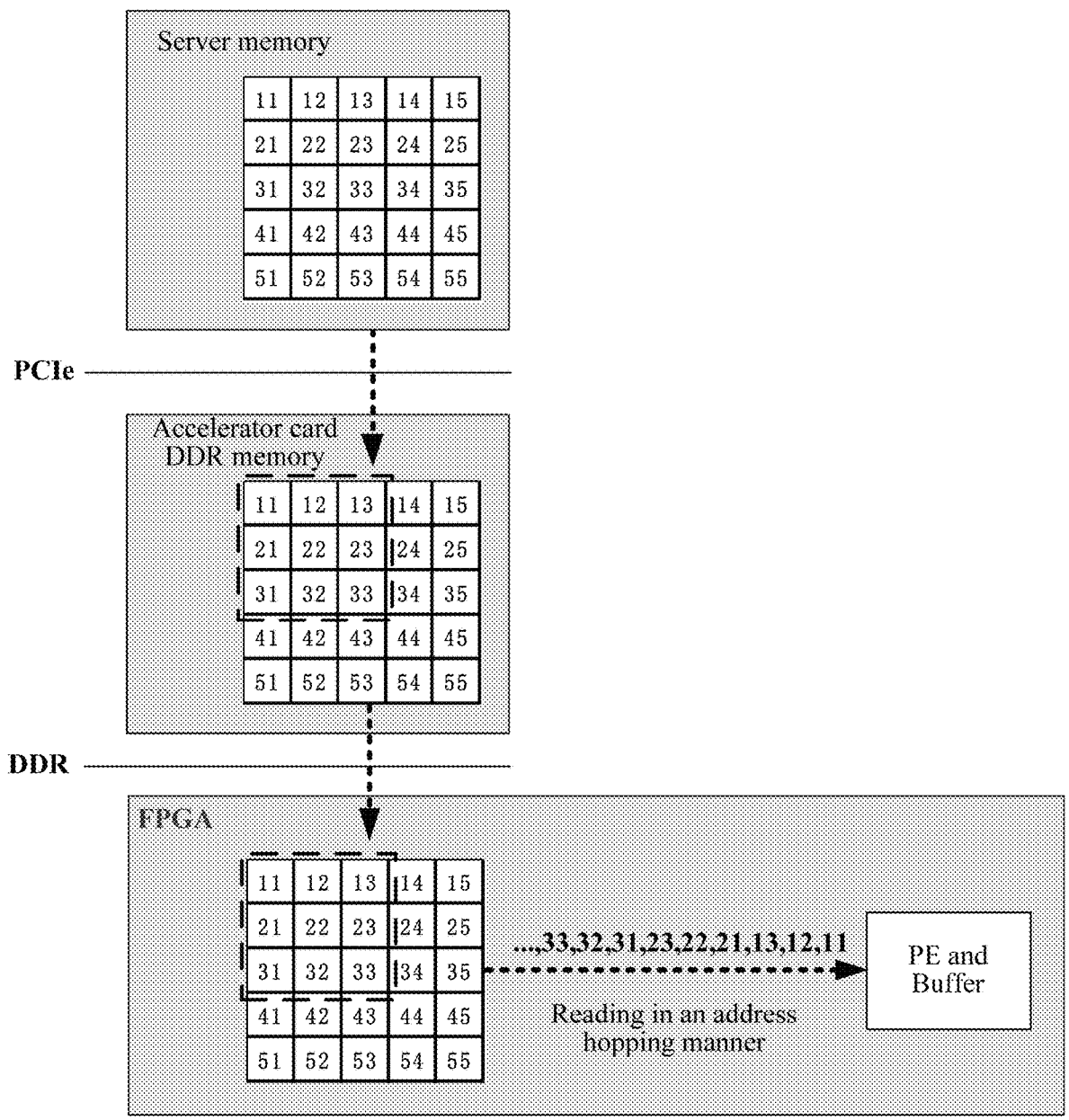
FIG. 6B is a schematic diagram of performing data expansion for a CNN on a Field Programmable Gate Array (FPGA)

Referring to FIG. 6B, a solution of performing data expansion by using the co-processor includes: storing the unexpanded data to a server memory, an accelerator card DDR memory, and an FPGA, and expanding, by the FPGA, data in the manner of FIG. 3A to FIG. 3I. As can be learned from FIG. 6B, because in this solution, data expansion is performed by using the manner shown in FIG. 3A to FIG. 3I, some pieces of data are repeatedly read, resulting in relatively low efficiency of data expansion, a large volume of transmitted DDR memory data, and a lot of storage units on the FPGA chip that need to be consumed.

The system shown in FIG. 5 and the image data matrix and the eigenmatrix shown in FIG. 5 are used as an example to introduce the data processing method provided by one embodiment of the present disclosure. It is assumed that the convolution step length S=1, and the data processing apparatus of one embodiment is integrated in the co-processor.

Figure 7A:
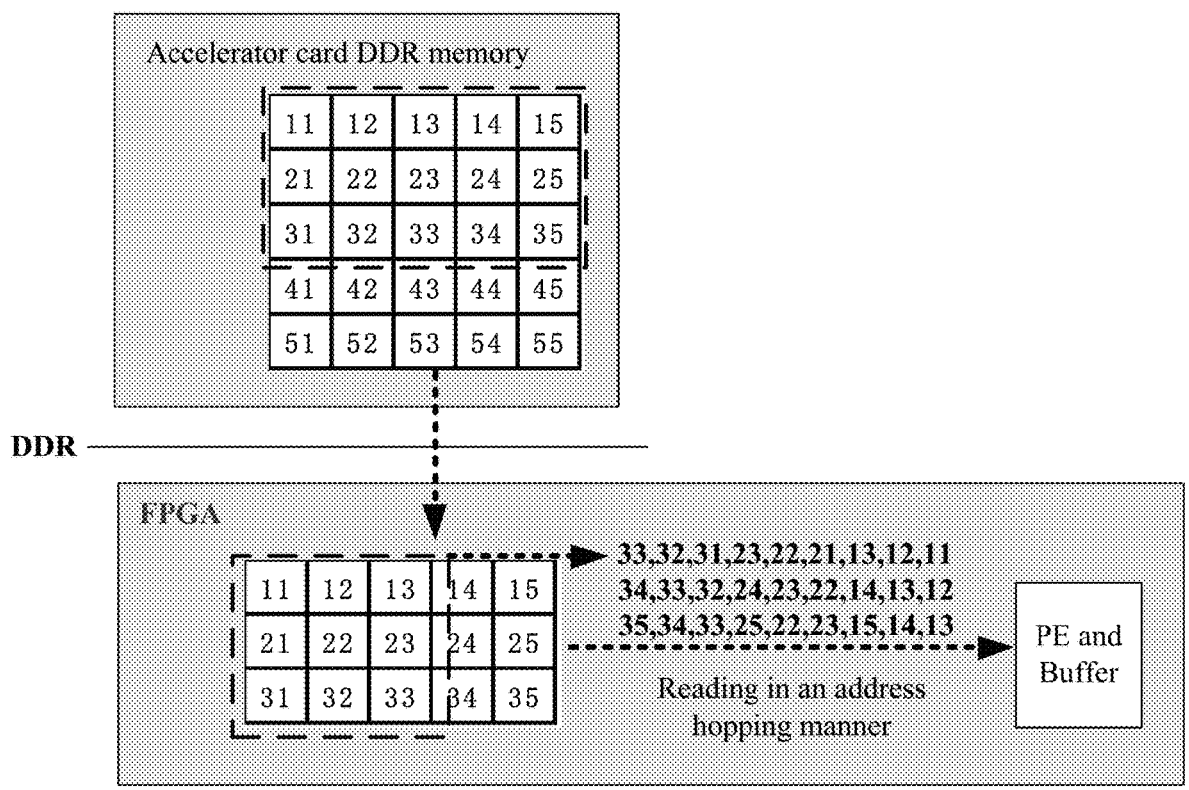
FIGS. 7A-7C are schematic diagrams of data expansion for a CNN according to an embodiment of the present disclosure.
Figure 7B:
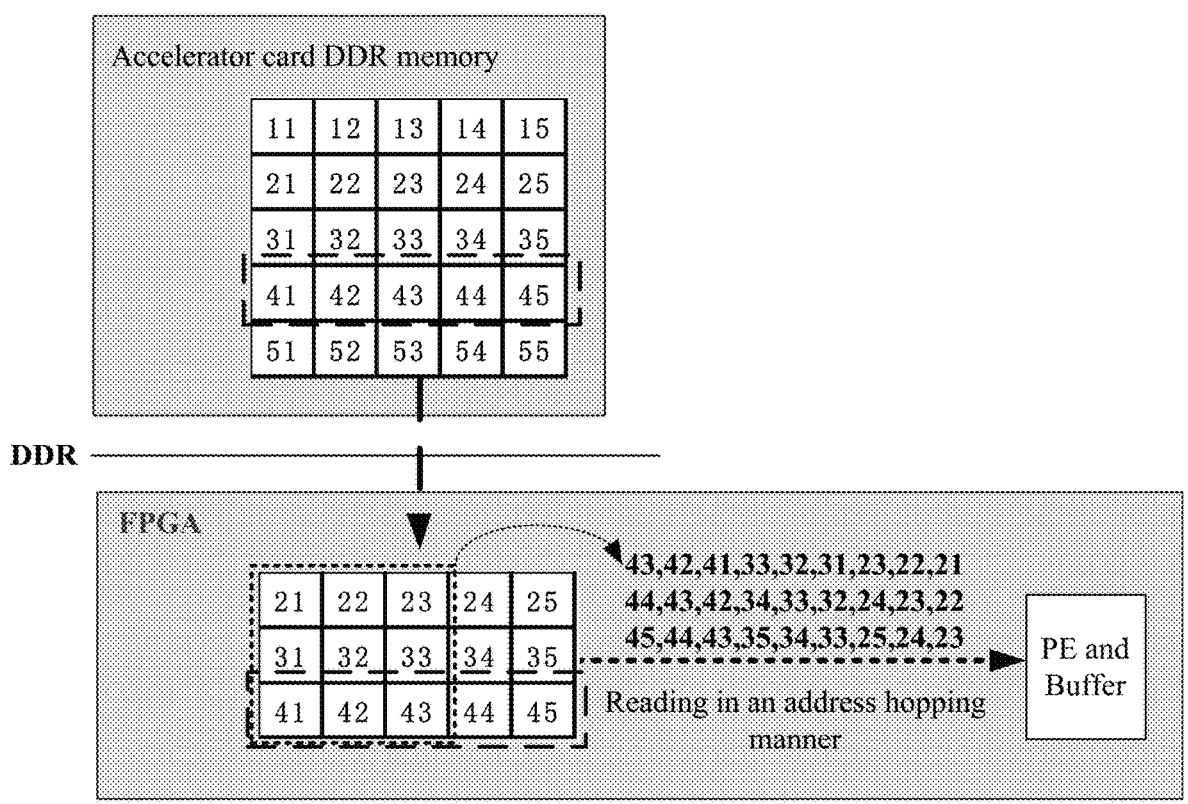
Figure 7C:
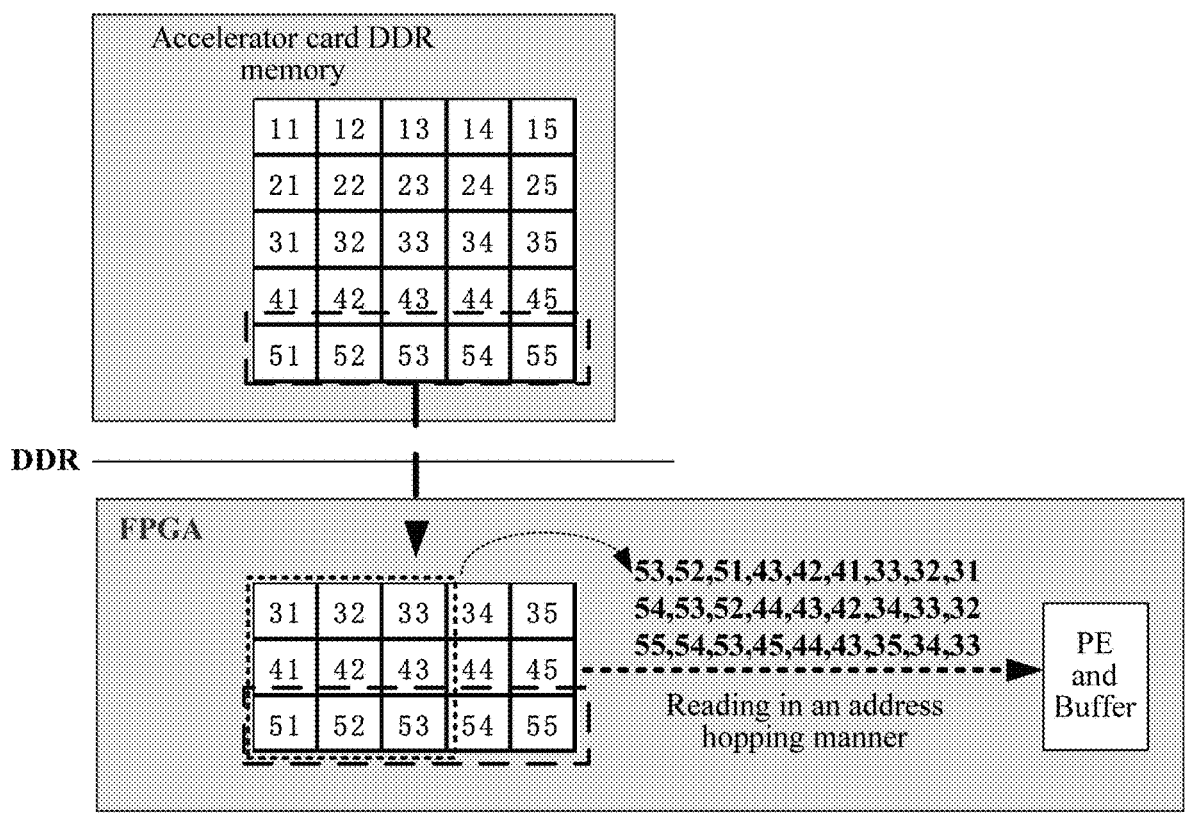

Referring to FIG. 7A to FIG. 7C, the image data matrix is stored in the DDR memory on the accelerator card. Specifically, the data expansion process is as follows:

(1) K=3 rows of data [11, 12, 13, 14, 15], [21, 22, 23, 24, 25], and [31, 32, 33, 34, 35] in the image data matrix are read, to obtain a to-be-expanded data matrix, and the to-be-expanded data matrix is loaded in to the memory of the co-processor, as shown in FIG. 7A.

(2) Data sliding and expansion is performed on the to-be-expanded data matrix in the memory, to obtain expanded data [11, 12, 13, 21, 22, 23, 31, 32, 33], [12, 13, 14, 22, 23, 24, 32, 33, 34], and [13, 14, 15, 23, 24, 25, 33, 34, 35], as shown in FIG. 7A.

Specifically, a sliding window can be determined based on row and column data of the eigenmatrix, then, the window is slid along a row direction of the to-be-expanded data matrix at a sliding step length of one piece of data, and after each time the window is slid, corresponding data is read from the memory in an address hopping manner based on a storage address of data in the window in the memory, to implement data expansion.

(3) The fourth row of data [41, 42, 43, 44, 45] in the image data matrix is loaded to the memory, and the first row of data [11, 12, 13, 14, 15] (that is, a row of data currently having an earliest storage time) in the current to-be-expanded data matrix is overwritten, to update the to-be-expanded data matrix, as shown in FIG. 7B.

(4) Data sliding and expansion is performed on the updated to-be-expanded data matrix, to obtain expanded data [21, 22, 23, 31, 32, 33, 41, 42, 43], [22, 23, 24, 32, 33, 34, 42, 43, 44], and [23, 24, 25, 33, 34, 35, 43, 44, 45], as shown in FIG. 7B.

(5) The fifth row of data [51, 52, 53, 54, 55] in the image data matrix is loaded to the memory, and the first row of data [21, 22, 23, 24, 25] in the current to-be-expanded data matrix is overwritten, to update the to-be-expanded data matrix, as shown in FIG. 7C.

(6) Data sliding and expansion is performed on the updated to-be-expanded data matrix, to obtain expanded data [31, 32, 33, 41, 42, 43, 51, 52, 53], [32, 33, 34, 42, 43, 44, 52, 53, 54], [33, 34, 35, 43, 44, 45, 53, 54, 55], as shown in FIG. 7C.

Based on the foregoing description of the data expansion solution, the data expansion solution shown in FIG. 7A to FIG. 7C can improve data expansion efficiency. In addition, in one embodiment of the present disclosure, data expansion is performed in the co-processor, and data expansion is performed in a multiplexed reading manner, the volume of read-out data can be reduced, thereby reducing requirements for reading bandwidth of the PCI-e and DDR memory and improving the processing capability of the system.

Accordingly, the data expansion solution shown in FIG. 7A to FIG. 7C can improve data expansion efficiency and can also save storage space of the co-processor, thereby reducing requirements of data expansion on corresponding storage space and improving the processing capability of the system.

To improve efficiency of reading data from the DDR memory and data expansion efficiency, in one embodiment, a preset number of pieces of data in the image data matrix can be read based on a fixed data size. That is, the process of reading a preset number of pieces of unexpanded data in the image data matrix may include: reading a preset number of pieces of unexpanded data in the image data matrix based on a first predetermined data volume; and storing the unexpanded data to the preset buffer space.

The first predetermined data volume may be set based on actual requirements, for example, 8 Kbyte, 16 Kbyte, or the like. The unexpanded data of the first predetermined data volume may be referred to as a data packet (packet). The first predetermined data volume may be set based on row data or column data of the image data matrix, for example, may be an integer multiple of the data volume of the row data or column data.

To improve data expansion efficiency and a utilization ratio of a buffer space, in one embodiment of the present disclosure, when remaining space of the preset buffer space is sufficient for loading a new packet, data is read out and loaded. That is, the process of reading a preset number of pieces of unexpanded data in the image data matrix based on a first predetermined data volume may include: obtaining a remaining available capacity of the preset buffer space; and when the remaining available capacity of the preset buffer space is greater than or equal to the first predetermined data volume, reading the preset number of pieces of unexpanded data in the image data matrix based on the first predetermined data volume.

Because the first predetermined data volume is set based on actual requirements, and a packet loaded each time is greater than a data volume of a row or a column of data in the image data matrix, after a new packet is loaded, a specific number of pieces of target data can be selected from the packet to update the to-be-expanded data matrix. That is, the process of updating the to-be-expanded data matrix based on the unexpanded data may include: selecting a preset number of pieces of target data from the unexpanded data; and updating the to-be-expanded data matrix based on the target data.

Specifically, data belonging to the same row or same column in the image data matrix may be selected. For example, the first predetermined data volume is a data volume of 8 pieces of data. That is, a packet includes 8 pieces of data in the image data matrix. After expansion on the to-be-expanded data matrix is completed, 8 pieces of unexpanded data may be read from the image data matrix and are assumed to be [41, 42, 43, 44, 45, 51, 52, 53] in FIG. 7A. Subsequently, target data located on a same row, that is, [41, 42, 43, 44, 45], is selected from the 8 pieces of unexpanded data, and the to-be-expanded data matrix is updated based on the target data. In addition, when the target data is selected, a relationship with the last row or last column of data of the to-be-expanded data matrix also needs to be considered.

To improve a data expansion speed, in the method of one embodiment, data expansion can be performed when data currently buffered by the preset buffer space is sufficient for data expansion. That is, the process of performing data expansion on the to-be-expanded data matrix based on the matrix parameter and a storage address of data of the to-be-expanded data matrix in the preset buffer space may include: obtaining a current buffer data volume of the preset buffer space; and when the buffer data volume is greater than or equal to the second predetermined data volume, performing data expansion on the to-be-expanded data matrix based on the matrix parameter and the storage address of the data of the to-be-expanded data matrix in the preset buffer space.

The second predetermined data volume may be determined based on numbers of rows and columns of the eigenmatrix and numbers of rows and columns of the image data matrix. In an example where the image data matrix is an N*N matrix, and the eigenmatrix is a K*K matrix, the second preset data volume may be a data volume of K*N pieces of data.

Accordingly, one embodiment of the present disclosure uses the following steps: obtaining a matrix parameter of an eigenmatrix; then reading corresponding data in an image data matrix from based on the matrix parameter, to obtain a to-be-expanded data matrix; performing data expansion on the to-be-expanded data matrix based on the matrix parameter, to obtain expanded data; reading a preset number of pieces of unexpanded data in the image data matrix, and updating, based on the unexpanded data, the to-be-expanded data matrix; and returning to the step of performing expansion on the to-be-expanded data matrix based on the matrix parameter. In this solution, during a convolution process, the read-out image data can be multiplexed to implement data expansion, so as to avoid repeatedly reading of some pieces of data, and reduce requirements of CNN data expansion for data bandwidth or storage space. Therefore, a data processing capability and data expansion efficiency of a processing system for a CNN can be improved.

According to the method described in the embodiments shown in FIG. 1, a data processing method for a CNN is further described in detail below.

In one embodiment, descriptions are provided by using the data processing apparatus for a CNN integrated in a co-processor of a computing device and a system architecture shown in FIG. 5. The co-processor may be an FPGA, an ASIC, or a co-processor of another type. In one embodiment, an image data matrix is stored in a DDR memory of a processing system.

Figure 8A:
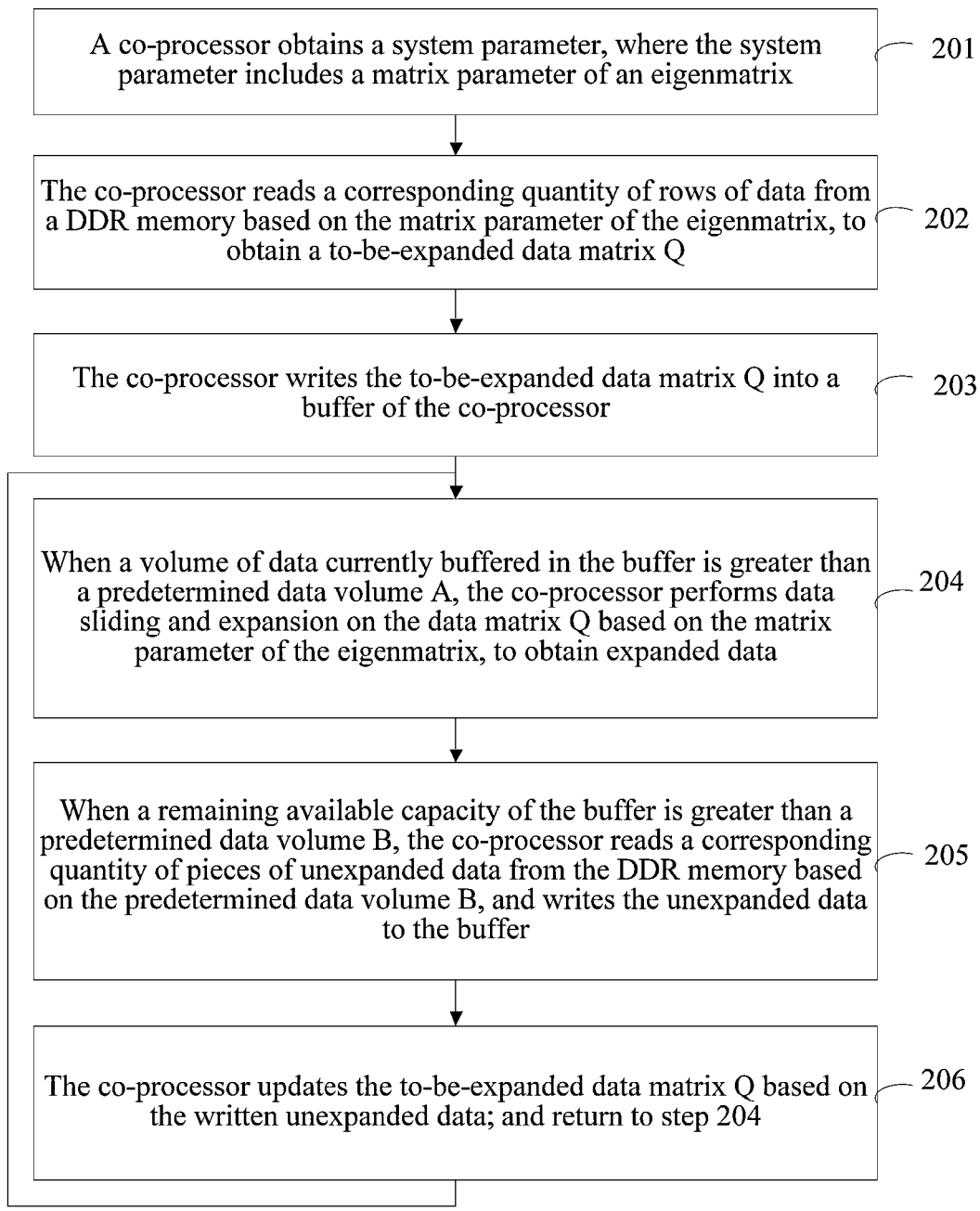
FIG. 8A is another flowchart of a data processing method for a CNN according to an embodiment of the present disclosure.

As shown in FIG. 8A, a data processing method for CNN may include the following specific procedure.

Step 201: A co-processor obtains a system parameter, where the system parameter includes a matrix parameter of an eigenmatrix.

The matrix parameter may include numbers of rows and columns of the eigenmatrix. In one embodiment, the system parameter may further include numbers of rows and columns of an image data matrix, a predetermined data volume B, a predetermined data volume A, a sliding direction, a sliding step length, and the like.

Step 202: The co-processor reads a corresponding number of rows of data from a DDR memory based on the matrix parameter of the eigenmatrix, to obtain a to-be-expanded data matrix Q.

For example, K rows of data of an N*N image data matrix are read from the DDR memory, to obtain a K*N to-be-expanded data matrix Q. Specifically, the first to $K^{th}$ rows of data of the N*N image data matrix are read.

Using the 5*5 image data matrix and the 3*3 eigenmatrix shown in FIG. 2A as an example, an FPGA can read first to third rows of data from the 5*5 image data matrix, to form a 3*5 to-be-expanded data matrix Q.

Step 203: The co-processor writes the to-be-expanded data matrix Q into a buffer of the co-processor. For example, the FPGA writes the 3*5 to-be-expanded data matrix Q into a buffer in the FPGA.

Step 204: When the volume of data currently buffered in the buffer is greater than a predetermined data volume A, the co-processor performs data sliding and expansion on the data matrix Q based on the matrix parameter of the eigenmatrix, to obtain expanded data.

The predetermined data volume A may be a data volume of 3*5 pieces of data, and can be specifically set based on actual requirements.

Figure 8B:
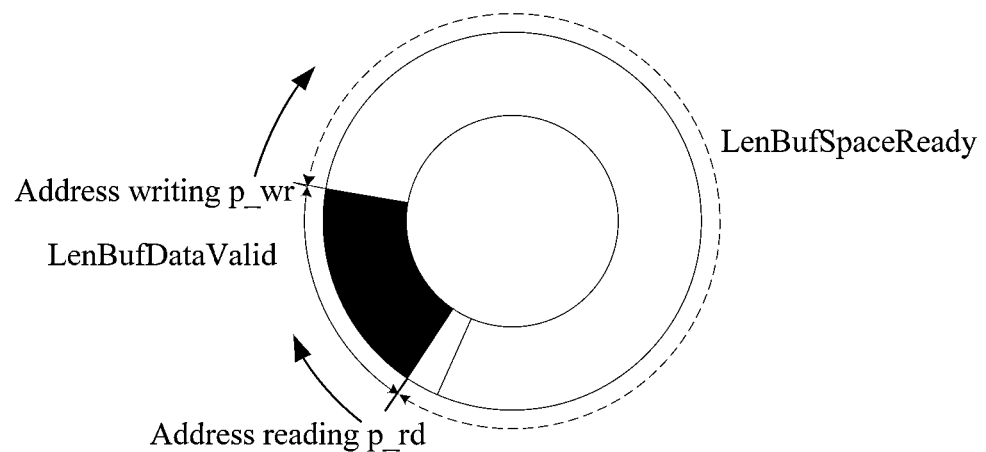
FIG. 8B is a schematic diagram of reading and writing a ring buffer according to an embodiment of the present disclosure.

In one embodiment, the buffer may be a ring buffer. Referring to FIG. 8B, the ring buffer has two indicators. One is LenBufSpaceReady, used for representing a remaining space or a remaining available capacity of the ring buffer. The other is LenBufDataValid, used for presenting a buffer data volume currently buffered by the ring buffer.

After data is written, LenBufSpaceReady is reduced by 1, and LenBufDataValid is increased by 1. When expansion is performed and data is read, LenBufSpaceReady is increased by 1, and LenBufDataValid is reduced by 1. In one embodiment, data can be concurrently loaded and written, and expanded and read, to improve data expansion efficiency.

When determining that LenBufDataValid is greater than the predetermined data volume A, the co-processor performs data sliding and expansion on the data matrix Q based on the matrix parameter of the eigenmatrix. Otherwise, data sliding and expansion is not performed.

Using the 5*5 image data matrix and the 3*3 eigenmatrix shown in FIG. 2A as an example, the FPGA may perform data sliding and expansion on a 3*5 to-be-expanded data matrix Q in a manner shown in FIG. 2B to FIG. 2D, to obtain expanded data (11, 12, 13, 21, 22, 23, 31, 32, 33), (12, 13, 14, 22, 23, 24, 32, 33, 34), and (13, 14, 15, 23, 24, 25, 33, 34, 35).

Step 205: When the remaining available capacity of the buffer is greater than a predetermined data volume B, the co-processor reads a corresponding number of pieces of unexpanded data from the DDR memory based on the predetermined data volume B, and writes the unexpanded data to the buffer.

For example, when determining that LenBufSpaceReady is greater than the predetermined data volume B, the co-processor reads the predetermined data volume B of unexpanded data from the DDR memory, and writes the unexpanded data to the buffer.

The predetermined data volume B is a fixed data volume, that is, a fixed data size, and can be set based on actual requirements. For example, the predetermined data volume B may be 8 Kbyte or the like, and the predetermined data volume B may be set based on a data volume of a row or a column of data in the image data matrix.

For example, referring to FIG. 7A and FIG. 7B, after data sliding and expansion is performed on a 3*3 to-be-expanded data matrix, the fourth row of unexpanded data [41, 42, 43, 44, 45] can be read and written to the buffer.

In one embodiment, when the predetermined data volume B is a data volume of a row or a column of data in the image data matrix, that is, when a number of pieces of image data corresponding to the predetermined data volume B is equal to a number of columns and a number of rows of the matrix, the co-processor can read a row or a column of unexpanded data in the image data matrix from the DDR memory. For example, the $(K+1)^{th}$ row of unexpanded data, that is, N pieces of unexpanded data, can be read.

In another embodiment, a number of pieces of image data corresponding to the predetermined data volume B is greater than N, but is not an integer multiple of N, for example, may be N+1 or the like. For example, after data sliding and expansion is performed on a 3*3 to-be-expanded data matrix, seven pieces of unexpanded data [41, 42, 43, 44, 45, 51, 52] can be read and written to the buffer based on the predetermined data volume B.

Step 206: The co-processor updates the to-be-expanded data matrix Q based on the written unexpanded data; and the method returns to Step 204.

For example, after the $(K+1)^{th}$ row of unexpanded data is written, the to-be-expanded data matrix Q can be updated based on the $(K+1)^{th}$ row of unexpanded data. For example, the first row of data of the matrix Q is overwritten based on the $(K+1)^{th}$ row of data.

For example, after the $(N+1)^{th}$ row of unexpanded data is written, corresponding N pieces of unexpanded data can be selected and, then, the first row of data of the matrix Q is overwritten based on the selected N pieces of unexpanded data.

Figure 8C:
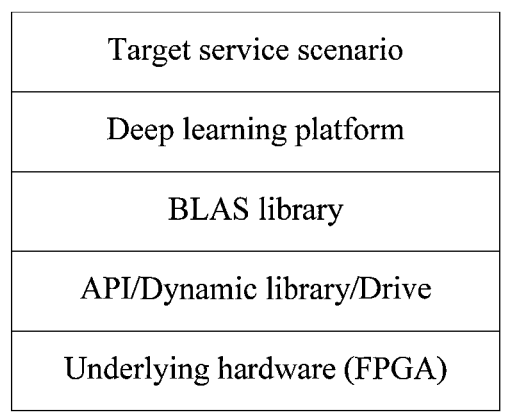
FIG. 8C is a schematic architectural diagram of a CNN-based service scenario according to an embodiment of the present disclosure.

The data processing method of one embodiment of the present disclosure is applied to all services that can be implemented by a heterogeneous processing system using an FPGA as a co-processor or a pure CPU processing system. For example, the method may be applied to a service scenario whose objective is detecting and screening erotic pictures. Referring to FIG. 8C, an open source deep learning platform, such as Caffe or TensorFlow, is used for implementation. When a CNN model (such as AlexNet, GoogleNet, or VGG) is implemented, the learning platform invokes a basic linear algebra subprograms (BLAS) library to perform matrix operations. In a pure-CPU processing system the matrix operations are calculated by a CPU. In a heterogeneous processing system, the matrix operations may be offloaded to the FPGA for calculation (perform exchange generally through the PCI-e). During a calculation process, the CPU and FPGA perform data exchange in a DDR memory sharing manner.

Accordingly, one embodiment of the present disclosure uses a co-processor to obtain a matrix parameter of an eigenmatrix; then read corresponding data in an image data matrix from based on the matrix parameter, to obtain a to-be-expanded data matrix; perform data expansion on the to-be-expanded data matrix based on the matrix parameter, to obtain expanded data; read a preset number of pieces of unexpanded data in the image data matrix, and update, based on the unexpanded data, the to-be-expanded data matrix; and return to the step of performing expansion on the to-be-expanded data matrix based on the matrix parameter. In this solution, during a convolution process, the read-out image data can be multiplexed to implement data expansion, so as to avoid repeatedly reading of some pieces of data, and reduce requirements of CNN data expansion for data bandwidth or storage space. Therefore, a data processing capability and data expansion efficiency of a processing system for a CNN can be improved.

Figure 9A:
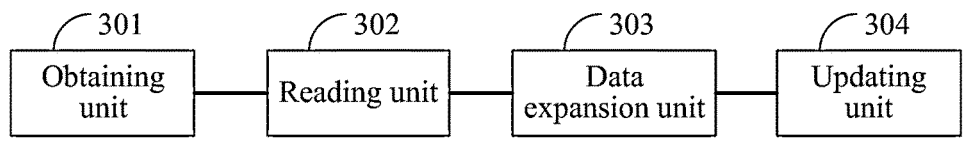
FIG. 9A is a schematic structural diagram of a data processing apparatus for a CNN according to an embodiment of the present disclosure.
Figure 9B:
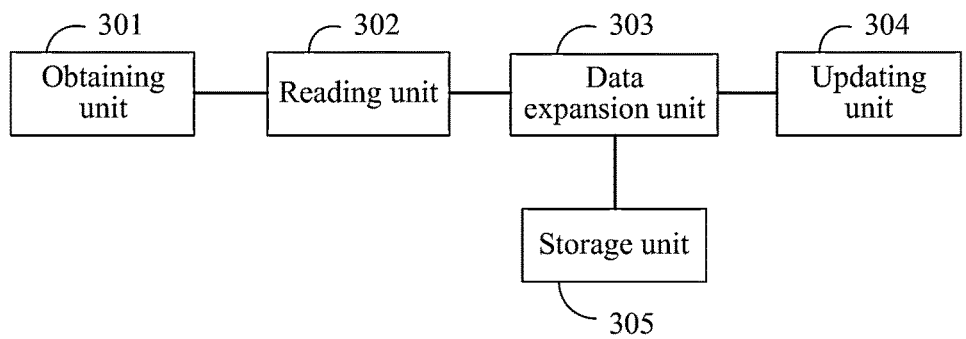
FIG. 9B is another schematic structural diagram of a data processing apparatus for a CNN according to an embodiment of the present disclosure.

To implement the foregoing method better, the embodiments of the present disclosure further provide a data processing apparatus for a CNN. The data processing apparatus may be specifically integrated in a processor of a computing device. The processor may be an FPGA, an ASIC, a GPU, or a co-processor of another type. As shown in FIG. 9A, the data processing apparatus for a CNN may include an obtaining unit 301, a reading unit 302, a data expansion unit 303, and an updating unit 304 as follows:

The obtaining unit 301 is configured to obtain a matrix parameter of an eigenmatrix.

The eigenmatrix is a convolution kernel of a convolution operation, and is also referred to as a weight matrix. The eigenmatrix may be set based on actual requirements. The matrix parameter(s) of the eigenmatrix may include numbers of rows and columns of a matrix and may be referred to as a size of the convolution kernel.

The reading unit 302 is configured to read corresponding data in an image data matrix from a first buffer space based on the matrix parameter through a first bus, to obtain a to-be-expanded data matrix.

An element in the image data matrix is pixel data, such as a processed pixel value, corresponding to an image pixel. Numbers of rows and columns of the image data matrix represent the size of an image.

For example, the reading unit 302 is configured to read a matrix with a corresponding number of rows or a corresponding number of columns in the image data matrix from the first buffer space based on the matrix parameter through the first bus.

When the matrix parameter includes numbers of rows and columns of the eigenmatrix, a read-out number of rows may correspond to the number of rows of the eigenmatrix, or a read-out number of columns may correspond to the number of columns of the eigenmatrix.

The storage unit 305 is configured to after the reading unit 302 obtains the to-be-expanded data matrix, and before the data expansion unit 303 performs data expansion, send and store the to-be-expanded data matrix to a second preset buffer space through a second bus.

The data expansion unit 303 is configured to read the to-be-expanded data matrix from the second preset buffer space through the second bus, and perform data expansion on the to-be-expanded data matrix based on the matrix parameter, to obtain expanded data.

For example, the data expansion unit 303 is configured to perform data sliding and expansion on the to-be-expanded data matrix based on the matrix parameter.

The data expansion unit is specifically configured to perform data expansion on the to-be-expanded data matrix based on the matrix parameter and a storage address of data of the to-be-expanded data matrix in the second preset buffer space.

Specifically, the data expansion unit 303 may include: a determining subunit, a sliding subunit, an address obtaining subunit, and a reading subunit.

The determining subunit is configured to determine a sliding window based on the matrix parameter. The sliding subunit is configured to slide the sliding window on the to-be-expanded data matrix based on a preset sliding direction and a preset sliding step length. The address obtaining subunit is configured to obtain a storage address of data in the sliding window in the second preset buffer space after each time of sliding. The reading subunit is configured to read the corresponding data from the second preset buffer space based on the storage address, to complete the data expansion.

The determining subunit can be configured to determine a sliding window of a corresponding size based on row and column data of the eigenmatrix. For example, when the eigenmatrix is a K*K matrix, a K*K sliding window can be determined. The sliding window may be used for selecting corresponding data from the to-be-expanded data matrix for expansion.

The preset sliding direction may include: a row direction, a column direction, and the like of the image data matrix. The preset sliding step length is a needed sliding distance, can be set based on actual requirements for data expansion, and can be represent by a number of pieces of data need to be slid in the data matrix. For example, the preset sliding step length is one piece, two pieces, or three pieces of data, or the like.

The sliding subunit may be specifically configured to slide or move the sliding window on the to-be-expanded data matrix along a preset sliding direction at a preset sliding step length. In one embodiment, the initial location of the sliding window on the to-be-expanded data matrix can be set based on actual requirements, For example, referring to FIG. 2B, sliding may be started from a first column of the to-be-expanded data matrix. In another embodiment, sliding may alternatively be started from a second or third column of the to-be-expanded data matrix.

The updating unit 304 is configured to read a corresponding number of pieces of unexpanded data in the image data matrix from the first buffer space through the first bus, send and store the unexpanded data to the second preset buffer space through the second bus, and update, based on the unexpanded data, the to-be-expanded data matrix stored in the second preset buffer space; and trigger the data expansion unit 303 to perform the step of reading the to-be-expanded data matrix from the second preset buffer space through the second bus, and performing expansion on the to-be-expanded data matrix based on the matrix parameter.

For example, the updating unit 304 may include: a reading subunit, an updating subunit, and a triggering subunit.

The reading subunit is configured to read the corresponding number of pieces of unexpanded data in the image data matrix from the first buffer space based on a first predetermined data volume through the first bus, and send and store the unexpanded data to the second preset buffer space through the second bus. The updating subunit is configured to update, based on the unexpanded data, the to-be-expanded data matrix stored in the second preset buffer space. The triggering subunit is configured to trigger, after the updating subunit updates the to-be-expanded data matrix, the data expansion unit 303 to perform the step of reading the to-be-expanded data matrix from the second preset buffer space through the second bus, and performing expansion on the to-be-expanded data matrix based on the matrix parameter.

The reading subunit is specifically configured to: obtain a remaining available capacity of the preset buffer space; and when the remaining available capacity of the second preset buffer space is greater than or equal to the first predetermined data volume, read the preset number of pieces of unexpanded data in the image data matrix from the first buffer space based on the first predetermined data volume through the first bus.

The updating subunit is specifically configured to: read the unexpanded data from the second preset buffer space through the second bus, and select a preset number of pieces of target data from the unexpanded data; and update, based on the target data, the to-be-expanded data matrix stored in the second preset buffer space.

In one embodiment, the data expansion unit 303 may be specifically configured to: obtain a current buffer data volume of the preset buffer space; and when the buffer data volume is greater than or equal to the second predetermined data volume, perform data expansion on the to-be-expanded data matrix based on the matrix parameter and the storage address of the data of the to-be-expanded data matrix in the second preset buffer space.

During specific implementation, the foregoing units may be implemented as independent entities, or may be combined arbitrarily, or may be implemented as a same entity or several entities. For specific implementation of the foregoing units, refer to the foregoing method embodiments. Details are not described herein again.

For example, in actual applications, functions of the obtaining unit 301 can be implemented by a data expansion controller, functions of the reading unit 302 can be implemented by a data expansion controller and a DDR memory data reading controller, functions of the data expansion unit 303 may be implemented by a data expansion controller, a data scanning controller, and an address generator, and functions of the updating unit 304 may be implemented by a data expansion controller and a DDR memory data reading controller.

Figure 9C:
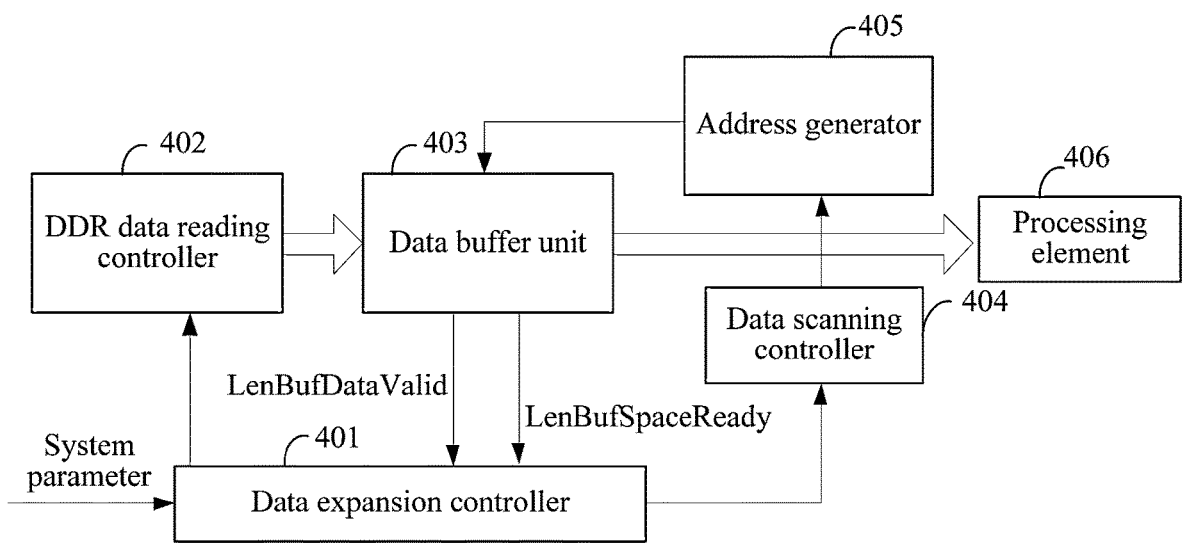
FIG. 9C is a schematic structural diagram of a co-processor according to an embodiment of the present disclosure.

As shown in FIG. 9C, one embodiment further provides a co-processor, including: a data expansion controller 401, a DDR memory data reading controller 402, a data buffer unit 403, a data scanning controller 404, an address generator 405, and a PE 406.

The data expansion controller 401 is configured to obtain a matrix parameter of an eigenmatrix, control the DDR memory data reading controller 402 to read corresponding data in an image data matrix based on the matrix parameter, to obtain a to-be-expanded data matrix, and write the to-be-expanded data matrix to the data buffer unit 403.

The data expansion controller 401 is further configured to control, based on a system parameter (for example, the matrix parameter of the eigenmatrix), the data scanning controller 404 and the address generator 405 to perform data expansion on the to-be-expanded data matrix, to obtain expanded data; control the DDR memory data reading controller 402 to read a preset number of pieces of unexpanded data in the image data matrix, and control the DDR memory data reading controller 402 to update the to-be-expanded data matrix based on the unexpanded data; and trigger the data scanning controller 404 and the address generator 405 to perform expansion on the to-be-expanded data matrix.

For example, the data expansion controller 401 may control, based on the system parameter (for example, the matrix parameter of the eigenmatrix) and a status (for example, a volume of currently buffered data) of the data buffer unit 403, the data scanning controller 404 and the address generator 405 to perform data expansion on the to-be-expanded data matrix. The data expansion controller 401 may alternatively control, based on a status (for example, a remaining available capacity) of the data buffer unit 403, the DDR memory data reading controller 402 to read a preset number of pieces of unexpanded data in the image data matrix.

The DDR memory data reading controller 402 is configured to controlled by the data expansion controller 401 to read corresponding data in the image data matrix, to obtain a to-be-expanded data matrix, read a preset number of pieces of unexpanded data in the image data matrix, update the to-be-expanded data matrix based on the unexpanded data, and write the read-out data to the data buffer unit 403.

The data buffer unit 403 is configured to buffer the data read by the DDR memory data reading controller 402, and output expanded data to the PE.

The data scanning controller 404 and the address generator 405 are configured to be controlled by the data expansion controller 401 to perform data expansion on the to-be-expanded data matrix.

The PE 406 is configured to perform a multiplication operation on the expanded data and the eigenmatrix, to implement a convolution operation.

In one embodiment, the data processing apparatus for a CNN may be specifically integrated in a co-processor device such as a CPU, an FPGA, an ASIC, or a GPU.

The embodiments of the present disclosure further provide a data processing apparatus for a CNN, including one or more processors and a storage medium. The processor includes a co-processor device such as a CPU, an FPGA, an ASIC, or a GPU, and the storage medium may be a non-volatile computer-readable storage medium, configured to store one or more computer-readable instructions. The one or more computer-readable instructions include an obtaining unit, a reading unit, a data expansion unit, and an updating unit. In another embodiment, the one or more computer-readable instructions further include a storage unit. The processor is configured to read the one or more computer-readable instructions stored in the storage medium, to implement steps of the data processing method for a CNN and functions of units of the data processing apparatus for a CNN in the foregoing embodiments.

Accordingly, in one embodiment of the present disclosure, the obtaining unit 301 obtains a matrix parameter of an eigenmatrix; then, the reading unit 302 reads corresponding data in an image data matrix from based on the matrix parameter, to obtain a to-be-expanded data matrix; the data expansion unit 303 performs data expansion on the to-be-expanded data matrix based on the matrix parameter, to obtain expanded data; and the updating unit 304 reads a preset number of pieces of unexpanded data in the image data matrix, updates, based on the unexpanded data, the to-be-expanded data matrix, and returns to the step of performing expansion on the to-be-expanded data matrix based on the matrix parameter. In this solution, during a convolution process, the read-out image data can be multiplexed to implement data expansion, so as to avoid repeatedly reading of some pieces of data, and reduce requirements of CNN data expansion for data bandwidth or storage space. Therefore, a data processing capability and data expansion efficiency of a processing system for a CNN can be improved.

A person of ordinary skill in the art may understand that all or some of the steps of the methods in the foregoing embodiments may be implemented by a program instructing relevant hardware. The program may be stored in a computer readable storage medium. The storage medium may include: a read-only memory (ROM), a random access memory (RAM), a magnetic disk, an optical disc, or the like.

A data processing method and apparatus for a CNN according to the embodiments of the present disclosure are described in detail above. The principle and implementations of the present disclosure are described herein by using specific examples. The descriptions of the embodiments of the present disclosure are merely used for helping understand the method and core ideas of the present disclosure. In addition, a person skilled in the art can make variations to the present disclosure in terms of the specific implementations and application scopes according to the ideas of the present disclosure. Therefore, the content of the specification shall not be construed as a limit to the present disclosure.

What is claimed is:

1. A data processing method for a convolutional neural network (CNN), implemented by a computing device, comprising:
(a). obtaining a matrix parameter of an eigenmatrix;
(b). reading corresponding data in an image data matrix from a first buffer space based on the matrix parameter, to obtain a next to-be-expanded data matrix, and sending and storing the to-be-expanded data matrix to a second preset buffer space;
(c). reading the to-be-expanded data matrix from the second preset buffer space, and performing data expansion on the to-be-expanded data matrix based on the matrix parameter, to obtain expanded data;
(d). reading a preset number of pieces of unexpanded data in the image data matrix from the first buffer space, sending and storing the unexpanded data to the second preset buffer space, and updating, based on the unexpanded data, the to-be-expanded data matrix stored in the second preset buffer space; and
(e). repeating (c) and (d) until all data in the image data matrix is completely read out on the to-be-expanded data matrix based on the matrix parameter.

2. The data processing method according to claim 1, wherein the performing data expansion on the to-be-expanded data matrix based on the matrix parameter comprises:
performing data expansion on the to-be-expanded data matrix based on the matrix parameter and a storage address of data of the to-be-expanded data matrix in the second preset buffer space.

3. The data processing method according to claim 2, wherein the performing data expansion on the to-be-expanded data matrix based on the matrix parameter and a storage address of data of the to-be-expanded data matrix in the second preset buffer space comprises:
determining a sliding window based on the matrix parameter;
sliding the sliding window on the to-be-expanded data matrix based on a preset sliding direction and a preset sliding step length;
obtaining the storage address of data in the sliding window in the second preset buffer space after each time of sliding; and
reading the corresponding data from the second preset buffer space based on the storage address of data, to complete the data expansion.

4. The data processing method according to claim 2, wherein the reading a preset number of pieces of unexpanded data in the image data matrix from the first buffer space through the first bus comprises:
reading the preset number of pieces of unexpanded data in the image data matrix from the first buffer space based on a first predetermined data volume through the first bus.

5. The data processing method according to claim 4, wherein the reading the preset number of pieces of unexpanded data in the image data matrix from the first buffer space based on a first predetermined data volume through the first bus comprises:
obtaining a remaining available capacity of the second preset buffer space; and
when the remaining available capacity of the second preset buffer space is greater than or equal to the first predetermined data volume, reading the preset number of pieces of unexpanded data in the image data matrix from the first buffer space based on the first predetermined data volume through the first bus.

6. The data processing method according to claim 4, wherein the updating, based on the unexpanded data, the to-be-expanded data matrix stored in the second preset buffer space comprises:
reading the unexpanded data from the second preset buffer space through the second bus, and selecting a preset number of pieces of target data from the unexpanded data; and
updating, based on the target data, the to-be-expanded data matrix stored in the second preset buffer space.

7. The data processing method according to claim 5, wherein the performing data expansion on the to-be-expanded data matrix based on the matrix parameter and a storage address of data of the to-be-expanded data matrix in the second preset buffer space comprises:
obtaining a current buffer data volume of the second preset buffer space; and
when the buffer data volume is greater than or equal to the second predetermined data volume, performing data expansion on the to-be-expanded data matrix based on the matrix parameter and the storage address of the data of the to-be-expanded data matrix in the second preset buffer space.

8. A data processing system, comprising:
a central processing unit (CPU) configured to process data associated with a convolutional neural network (CNN); and
a co-processor configured to performing operations of the CNN, including:
(a). obtaining a matrix parameter of an eigenmatrix;
(b). reading corresponding data in an image data matrix from a first buffer space based on the matrix parameter, to obtain a next to-be-expanded data matrix, and sending and storing the to-be-expanded data matrix to a second preset buffer space;
(c). reading the to-be-expanded data matrix from the second preset buffer space, and performing data expansion on the to-be-expanded data matrix based on the matrix parameter, to obtain expanded data;
(d). reading a preset number of pieces of unexpanded data in the image data matrix from the first buffer space, sending and storing the unexpanded data to the second preset buffer space, and updating, based on the unexpanded data, the to-be-expanded data matrix stored in the second preset buffer space; and
(e). repeating (c) and (d) until all data in the image data matrix is completely read out on the to-be-expanded data matrix based on the matrix parameter.

9. The data processing system according to claim 8, wherein the performing data expansion on the to-be-expanded data matrix based on the matrix parameter comprises:
performing data expansion on the to-be-expanded data matrix based on the matrix parameter and a storage address of data of the to-be-expanded data matrix in the second preset buffer space.

10. The data processing system according to claim 9, wherein the performing data expansion on the to-be-expanded data matrix based on the matrix parameter and a storage address of data of the to-be-expanded data matrix in the second preset buffer space comprises:
determining a sliding window based on the matrix parameter;

sliding the sliding window on the to-be-expanded data matrix based on a preset sliding direction and a preset sliding step length;

obtaining the storage address of data in the sliding window in the second preset buffer space after each time of sliding; and reading the corresponding data from the second preset buffer space based on the storage address of data, to complete the data expansion.

11. The data processing system according to claim 9, wherein the reading a preset number of pieces of unexpanded data in the image data matrix from the first buffer space comprises:

reading the preset number of pieces of unexpanded data in the image data matrix from the first buffer space based on a first predetermined data volume through a first bus.

12. The data processing system according to claim 11, wherein the reading the preset number of pieces of unexpanded data in the image data matrix from the first buffer space based on a first predetermined data volume through the first bus comprises:

obtaining a remaining available capacity of the second preset buffer space; and when the remaining available capacity of the second preset buffer space is greater than or equal to the first predetermined data volume, reading the preset number of pieces of unexpanded data in the image data matrix from the first buffer space based on the first predetermined data volume through the first bus.

13. The data processing system according to claim 11, wherein the updating, based on the unexpanded data, the to-be-expanded data matrix stored in the second preset buffer space comprises:

reading the unexpanded data from the second preset buffer space through a second bus, and selecting a preset number of pieces of target data from the unexpanded data; and updating, based on the target data, the to-be-expanded data matrix stored in the second preset buffer space.

14. The data processing system according to claim 12, wherein the performing data expansion on the to-be-expanded data matrix based on the matrix parameter and a storage address of data of the to-be-expanded data matrix in the second preset buffer space comprises:

obtaining a current buffer data volume of the second preset buffer space; and when the buffer data volume is greater than or equal to the second predetermined data volume, performing data expansion on the to-be-expanded data matrix based on the matrix parameter and the storage address of the data of the to-be-expanded data matrix in the second preset buffer space.

15. A non-transitory computer-readable storage medium storing computer program instructions executable by at least one processor to perform:

(a). obtaining a matrix parameter of an eigenmatrix;

(b). reading corresponding data in an image data matrix from a first buffer space based on the matrix parameter, to obtain a next to-be-expanded data matrix, and sending and storing the to-be-expanded data matrix to a second preset buffer space;

(c). reading the to-be-expanded data matrix from the second preset buffer space, and performing data expansion on the to-be-expanded data matrix based on the matrix parameter, to obtain expanded data;

(d). reading a preset number of pieces of unexpanded data in the image data matrix from the first buffer space, sending and storing the unexpanded data to the second preset buffer space, and updating, based on the unexpanded data, the to-be-expanded data matrix stored in the second preset buffer space; and (e). repeating (c) and (d) until all data in the image data matrix is completely read out on the to-be-expanded data matrix based on the matrix parameter.

16. The non-transitory computer-readable storage medium according to claim 15, wherein the performing data expansion on the to-be-expanded data matrix based on the matrix parameter comprises:

performing data expansion on the to-be-expanded data matrix based on the matrix parameter and a storage address of data of the to-be-expanded data matrix in the second preset buffer space.

17. The non-transitory computer-readable storage medium according to claim 16, wherein the performing data expansion on the to-be-expanded data matrix based on the matrix parameter and a storage address of data of the to-be-expanded data matrix in the second preset buffer space comprises:

determining a sliding window based on the matrix parameter;

sliding the sliding window on the to-be-expanded data matrix based on a preset sliding direction and a preset sliding step length;

obtaining the storage address of data in the sliding window in the second preset buffer space after each time of sliding; and reading the corresponding data from the second preset buffer space based on the storage address of data, to complete the data expansion.

18. The non-transitory computer-readable storage medium according to claim 16, wherein the reading a preset number of pieces of unexpanded data in the image data matrix from the first buffer space comprises:

reading the preset number of pieces of unexpanded data in the image data matrix from the first buffer space based on a first predetermined data volume through a first bus.

19. The non-transitory computer-readable storage medium according to claim 18, wherein the reading the preset number of pieces of unexpanded data in the image data matrix from the first buffer space based on a first predetermined data volume through the first bus comprises:

obtaining a remaining available capacity of the second preset buffer space; and when the remaining available capacity of the second preset buffer space is greater than or equal to the first predetermined data volume, reading the preset number of pieces of unexpanded data in the image data matrix from the first buffer space based on the first predetermined data volume through the first bus.

20. The non-transitory computer-readable storage medium according to claim 18, wherein the updating, based on the unexpanded data, the to-be-expanded data matrix stored in the second preset buffer space comprises:

reading the unexpanded data from the second preset buffer space through a second bus, and selecting a preset number of pieces of target data from the unexpanded data; and updating, based on the target data, the to-be-expanded data matrix stored in the second preset buffer space.

* * * * *